United States Patent [19]
Mazziotti

[11] Patent Number: 5,222,914
[45] Date of Patent: Jun. 29, 1993

[54] SERVICEABLE CV UNIVERSAL JOINT WITH INSERTS

[75] Inventor: Philip J. Mazziotti, Toledo, Ohio

[73] Assignee: The Zeller Corporation, Defiance, Ohio

[21] Appl. No.: 772,339

[22] Filed: Oct. 7, 1991

Related U.S. Application Data

[63] Continuation of Ser. No. 573,397, Aug. 27, 1990, abandoned, which is a continuation-in-part of Ser. No. 321,861, Mar. 10, 1989, abandoned.

[51] Int. Cl.⁵ .................................... F16D 3/223
[52] U.S. Cl. .................................. 464/144; 464/145; 464/906
[58] Field of Search .................. 464/143–146, 464/906

[56] References Cited

U.S. PATENT DOCUMENTS

| | | | |
|---|---|---|---|
| 1,208,252 | 12/1916 | Westinghouse | 464/143 |
| 1,843,211 | 2/1932 | Davis | 464/143 X |
| 2,128,088 | 8/1938 | Hanft | 464/143 |
| 2,427,237 | 9/1947 | Suczek | 464/906 X |
| 3,071,944 | 1/1963 | Mazziotti et al. | 464/906 X |
| 3,133,431 | 5/1964 | Zech | 464/144 |
| 4,541,819 | 9/1985 | Mazziotti | 464/144 |

FOREIGN PATENT DOCUMENTS

| | | | |
|---|---|---|---|
| 45-608 | 1/1970 | Japan | 464/145 |
| 760681 | 11/1956 | United Kingdom | 464/145 |
| 962454 | 7/1964 | United Kingdom | 464/145 |
| 2076936 | 12/1981 | United Kingdom | 464/144 |

Primary Examiner—Daniel P. Stodola
Assistant Examiner—William G. Battista, Jr.
Attorney, Agent, or Firm—Allen D. Gutchess, Jr.

[57] ABSTRACT

A constant velocity universal joint has replaceable inserts for ball grooves. The inserts and balls can be removed and replaced with new ones as needed, without the requirement of replacing the entire universal joint. The inserts can be made from solid blocks which are bored and cut in half to form inserts for the inner and outer races of the universal joint. The inserts can be machined and matched in particular ways to form a variety of designs of ball grooves.

17 Claims, 5 Drawing Sheets

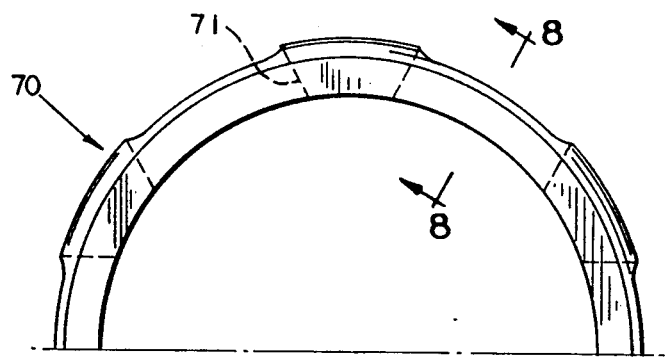
FIG. 7
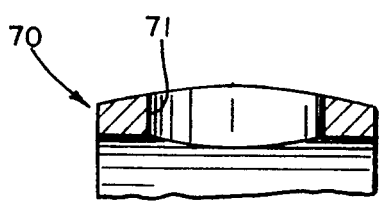
FIG. 8
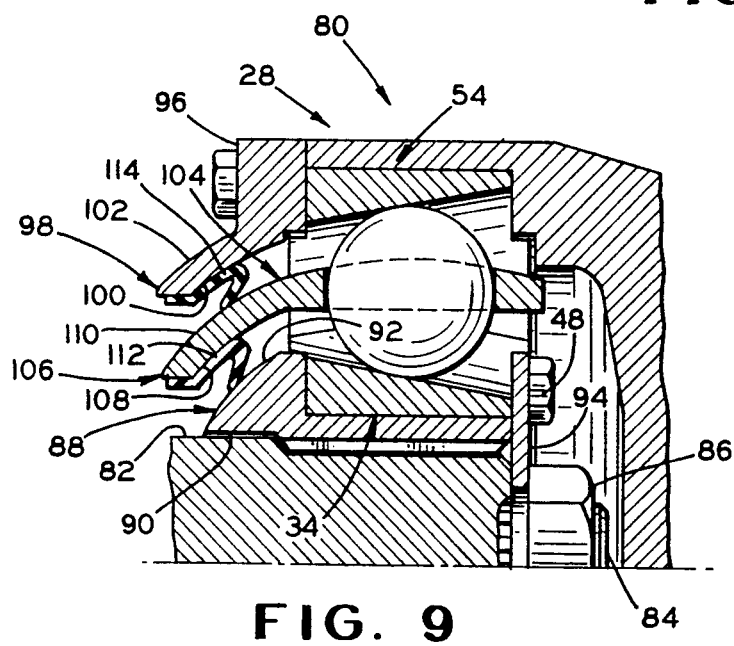
FIG. 9
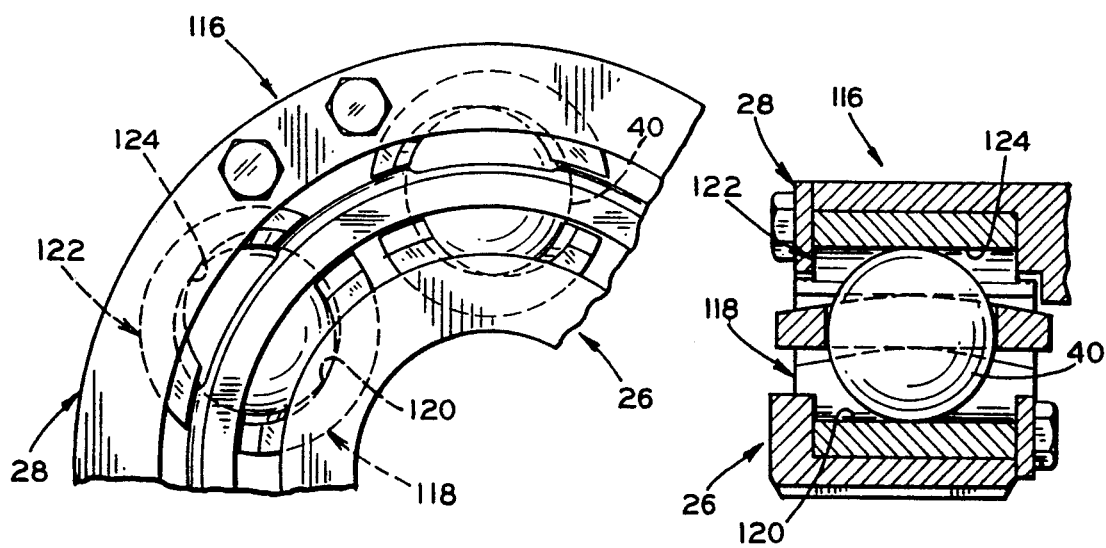
FIG. 10
FIG. 11

SERVICEABLE CV UNIVERSAL JOINT WITH INSERTS

This application is a continuation of my application Ser. No. 573,397, filed on Aug. 27, 1990, now abandoned, which is a continuation-in-part of my application Ser. No. 321,861, filed on Mar. 10, 1989, now abandoned.

This invention relates to a constant velocity universal joint which has replaceable inserts for ball grooves.

In a constant velocity universal joint, the torque is transmitted by balls which are arranged between inner and outer races and in contact with grooves therein. The balls are retained in openings in a cage located around the inner race. The only wear encountered in a constant velocity universal joint is in the cage, ball grooves, and balls. Usually, the entire universal joint is replaced when the ball and groove wear become excessive. At times, the grooves have been ground over-size to achieve smooth, uniform surfaces once again. Balls of larger diameter are then employed to fit the larger grooves. This repair is time-consuming, however, and it requires expensive machinery.

The present invention provides a constant velocity universal joint which has removable and replaceable inserts for the ball grooves. These are located in uniformly-spaced recesses around the inner and outer races. The inserts are preferably held in the recesses by suitable means such as retaining rings which are bolted to the corresponding inner and outer races and can be removed by conventional tools, such as wrenches. The inserts with the ball grooves thus can be replaced in the field, along with new balls, without the need of special equipment.

The ball groove inserts are preferably made from metal or other suitable material which can be made from a solid block with appropriate machining and then cut in half to form two inserts for inner and outer races. The inserts can be repositioned and matched to form grooves of different configurations.

The inserts are also preferably formed with end projections which are received in appropriate recesses in the races and cooperate with the retaining rings to prevent rotational movement of the inserts relative to the recesses in which they are retained.

It is, therefore, a principal object of the invention to provide a serviceable constant velocity universal joint with replaceable ball groove inserts.

Another object of the invention is to provide a constant velocity universal joint with ball groove inserts which can be replaced without the use of expensive or sophisticated equipment.

A further object of the invention is to provide a ball groove insert for a constant velocity universal joint which can be made from a solid block which is machined and then cut in half.

Many other objects and advantages of the invention will be apparent from the following detailed description of preferred embodiments thereof, reference being made to the accompanying drawings, in which:

FIG. 7 is a front view in elevation of one-half of a cage used with the universal joint of FIGS. 2 and 3;

FIG. 8 is a fragmentary view in transverse cross section taken along the line 8—8 of FIG. 7;

FIG. 9 is a fragmentary view in vertical section of one-half of a modified constant velocity universal joint embodying the invention;

FIG. 10 is a fragmentary front view in elevation of another modified constant velocity universal joint embodying the invention;

FIG. 11 is a fragmentary view in transverse cross section taken through a portion of the universal joint of FIG. 10;

Figure 1:
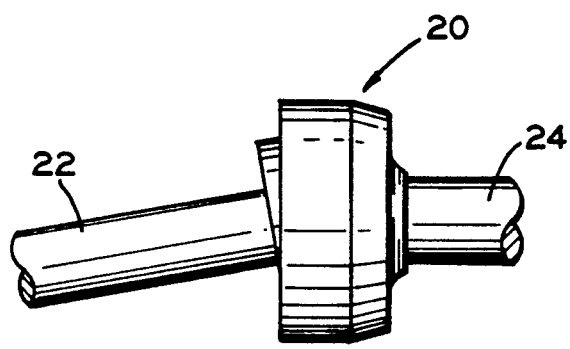
FIG. 1 is a schematic, overall view in elevation of a constant velocity universal joint embodying the invention.

Referring to the drawings, and particularly to FIG. 1, a constant velocity universal joint embodying the invention is indictated at 20 and is used to connect two shafts 22 and 24 located at angles to one another. The universal joint can be used in the usual vehicle applications and can be used for industrial purposes including connecting two shafts that are located at a constant, shallow angle relative to one another. In such an instance, a universal joint may be preferred to using a gear combination.

Figure 2:
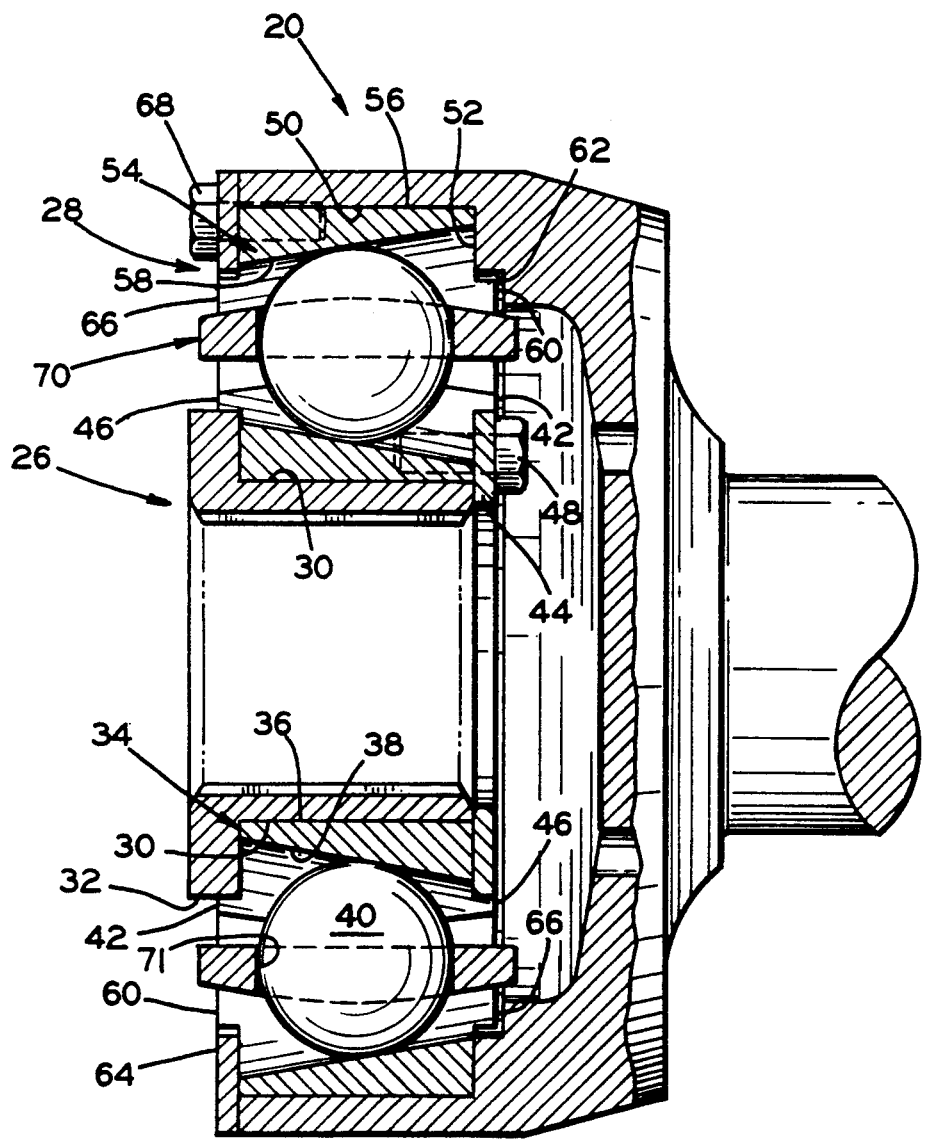
FIG. 2 is a greatly enlarged view mostly in vertical cross section of the constant velocity universal joint of FIG. 1.
Figure 3:
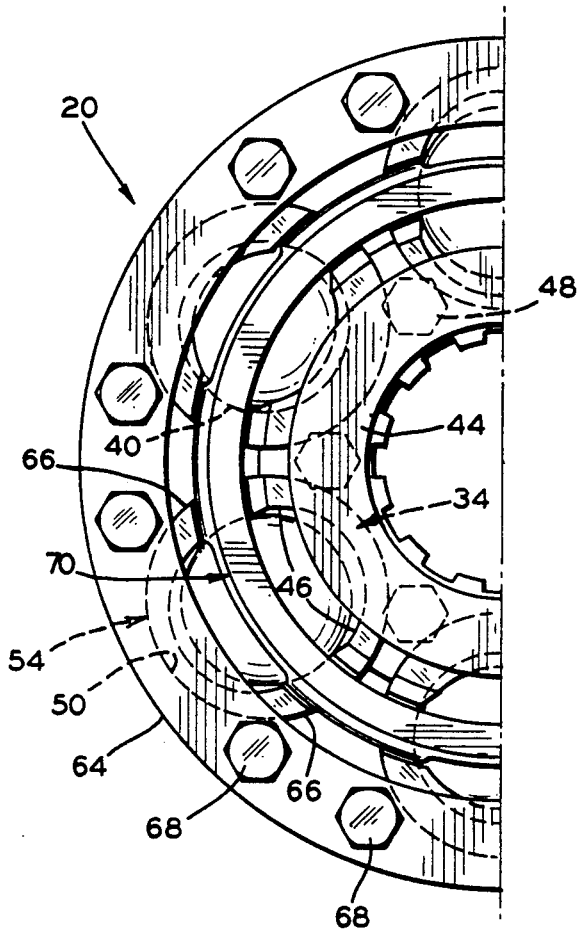
FIG. 3 is a front view in elevation of one-half of the universal joint of FIG. 2.

The universal joint 20 is shown more particularly in FIGS. 2 and 3. The joint includes an inner hub member or race 26 which is mounted on the shaft 22 by splines or other suitable means. The joint also includes an outer member or race 28 which is, in this instance, affixed to an end of the shaft 24. The inner race 26 has a plurality, in this case six, cavities or recesses 30 uniformly peripherally spaced therearound. The recesses 30 are of substantially semicircular shape in transverse cross section and extend a substantial portion of the length of the inner race. The inner race has a circular flange 32 at outer ends of the recesses 30.

An insert 34 is located in each of the recesses 30 and has an outer surface 36 of substantially semicircular shape in transverse cross section. The insert 34 has a groove 38 extending throughout its length, which groove is also of substantially semicircular shape in transverse cross section. Rolling elements 40, which can be in the form of balls or rollers, as shown in my U.S. Pat. No. 4,541,819, issued Sep. 17, 1985, are received in the groove 38. The groove 38, in this instance, extends diagonally through the insert 34, being deeper at one end than at the other. The outer end of the insert 34 has projections or shoulders 42 which extend over and mate with the peropheral edge of the flange 32 to aid in preventing rotation of the insert 34 in the recess 30.

A retainer 44 is affixed to the inner face of the inner hub 26 to retain the inserts 34 in place. The retainer 44 has an outer edge which is preferably substantially equal in diameter to the edge of the hub flange 32 and cooperates with projections 46 of the inserts 34 to further aid in preventing rotation of the inserts in the recesses 30. The retainer 44 preferably is affixed to the inner face of the inner hub 26 by suitable fasteners 48 which can be in the form of machine screws or bolts which are threaded into tapped holes in the face of the hub 26 between the recesses 30 or in the center of a solid hub. The fasteners 48 are designed to be capable of being removed in the field without the use of special tools.

The outer race 28 also has a plurality, in this case six, cavities or recesses 50 which are uniformly peripherally spaced therearound and face inwardly toward the recesses 30, being similar in size and shape. The recesses 50 are of substantially semicircular shape in transverse cross section and extend a substantial portion of the length of the outer race 28, terminating in inner ends 52.

An insert 54 is located in each of the recesses 50 and has an outer surface 56 of substantially semicircular shape in transverse cross section. The insert 54 also has an inwardly-facing groove 58 of substantially semicircular shape in transverse cross section to receive the rolling element 40. As shown, the groove 58 extends diagonally through the insert 54, being deeper at one end than the other. The inner end of the insert 54 has projections or shoulders 60 which extend into appropriately shaped recesses 62 which are formed beyond the end 52 of the recess 50 and cooperate with the projections 60 to aid in preventing rotation of the insert 54 relative to the hub recess 50.

A retaining ring 64 is affixed to an outer face of the outer race 28 and has an inner edge cooperating with projections 66 on the insert 54 to further aid in preventing rotation of the insert relative to the recess 50. The retaining ring 64 can be affixed to the face of the race 28 by suitable fasteners 68, such as machine screws or bolts, which can be fastened and removed with conventional tools. The inner edge of the retaining ring 64 is preferably equal in diameter to the maximum depth of the scalloped recesses 62 so that the projections 66 at the one end of the insert 54 can be the same as the projections 60 at the other end. Likewise, as discussed, the outer edge of the retainer 44 preferably is of the same diameter as the edge of the flange 32 so that the projections 42 and 46 can also be the same for the insert 34.

A cage 70 has radially-extending openings 71 which receive the rolling elements 40 and maintain them in a plane which bisects planes which are perpendicular to the axes of the shafts 22 and 24. The cage 70 is located between the inner and outer hubs 26 and 28 and is also between the edges of the inserts 34 and 54, the inserts tending to serve as guides for positioning the cage 70.

Figure 4:
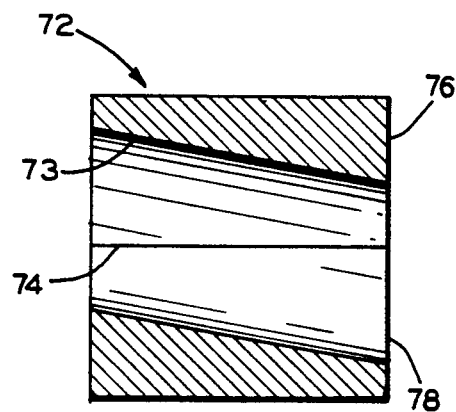
FIG. 4 is a somewhat schematic view in vertical cross section of a block used to make two ball groove inserts for the universal joint.
Figure 5:
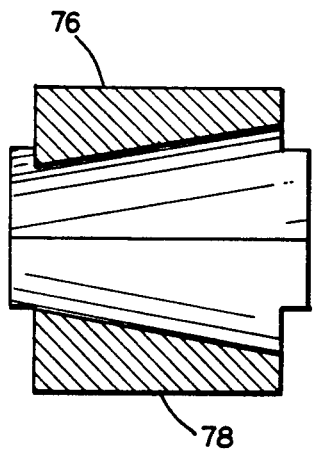
FIG. 5 is a view similar to FIG. 4 but showing the block further machined and repositioned.
Figure 6:
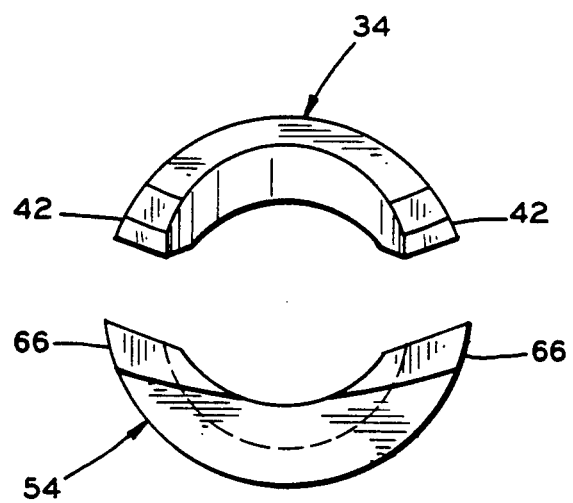
FIG. 6 is an end view of two inserts made from the block of FIGS. 4 and 5 after further machining.

Referring to FIGS. 4–6, the inserts 34 and 54 can be made from metal or other suitable material and usually hardened. When inner and outer inserts are made from a block 72, the outer surface is cylindrical to form the surfaces 36 and 56 of the inserts 34 and 54. A bore 73 can be made diagonally through the block 72 to form the insert grooves 38 and 58. After the block 72 is bored, it is cut or split along a line 74 in the plane perpendicular to the sheet in FIG. 4, producing two halves 76 and 78. After final machining, the inserts 34 and 54 are as shown in FIG. 6. Referring to FIG. 5, the upper half 76 can be turned 180° to form the groove configurations in FIGS. 2 and 3 and the ends are machined to form the projections for the inserts.

The universal joint 20 of FIGS. 1–3 is intended to be used in a case or housing containing lubricant. If the universal joint is to be used in the open, a modified universal joint 80, with seals to contain the lubricant, can be used, as shown in FIG. 9. A modified shaft 82 is used in place of the shaft 22 and has a threaded end 84 receiving a nut 86 or a solid shaft with a bolt retained ring. A modified inner hub member or race 88 is similar to the inner race 26 but has a modified end flange 90 with an outwardly-facing, convex surface 92. A retaining ring 94 has a smaller inner diameter than the retainer 44 with the inner peripheral edge of the ring 94 being received between the end of the shaft 82 and the nut 86.

The universal joint 80 can use the same outer hub 28 except that it has a modified retaining ring 96 which is thicker and has an extension 98 extending outwardly to form concave and convex surfaces 100 and 102.

A modified cage 104 is similar to the cage 70 but also has an extension 106 having concave and convex surfaces 108 and 110. Inner and outer resilient, annular seals 112 and 114, or a one piece seal serving both functions, are located between the surfaces 92 and 108 and the surfaces 110 and 100, respectively, of the inner hub flange 90, the cage extension 106, and the ring extension 98. These seals are of generally U-shaped configuration in transverse cross section and have outer surfaces engaging the respective convex and concave surfaces of the universal joint components. The seals enable the cavity of the outer hub 80 to be enclosed so that this cavity can be filled with suitable lubricant.

A modified universal joint 116 is shown in FIGS. 10 and 11. The joint 116 basically employs the same inner hub or race 26 and the outer race 28 but with different inserts for the rolling element grooves. An inner insert for the inner race 26 is indicated at 118 which differs from the insert 34 in that it has a diagonally-extending groove 120 for the rolling element 40 which is of uniform, substantially semicircular shape in transverse cross section throughout its length but with the axis of the groove being diagonal. An outer insert 122 for the outer race 28 has a groove at 124 for the rolling element 40, which groove is also of uniform, substantially semicircular shape in transverse cross section throughout its length. However, the groove 124 is diagonal in the opposite direction from the groove 120 so that the axes would form an "X" as viewed from above. A universal joint with rolling element cross grooves of this nature is disclosed more fully in my U.S. Pat. No. 3,071,944, issued Jan. 8, 1963.

The inserts 118 and 122 can be made from the solid block 72 of FIG. 4. However, after the bore 73 is formed, the block is split in a plane through the line 74 which is parallel to the sheet. The bottom of one block is then used with the top of another block to form the cross groove arrangement. Inserts with curved rolling element grooves can also be employed in a constant velocity universal joint, but more complicated machining techniques are required.

A replacement kit for a universal joint in accordance with the invention can include inserts for the inner and outer races, rolling elements, and a cage and seals where appropriate.

Figure 13:
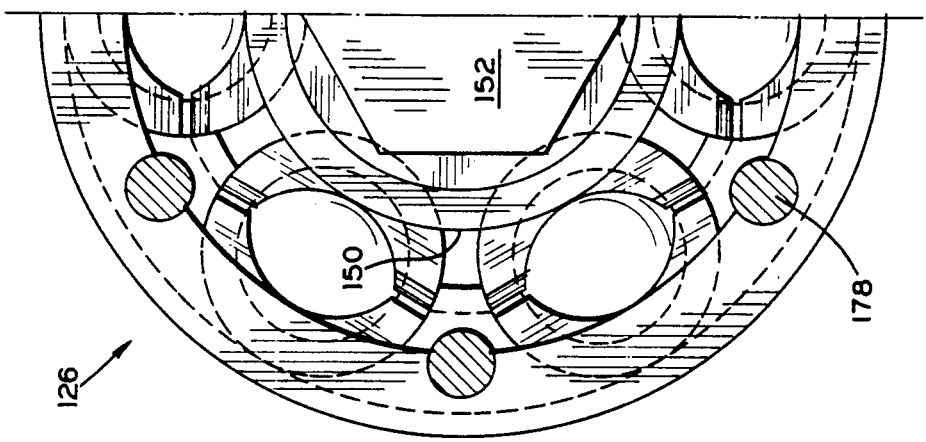
FIG. 13 is a view in section of one-half on the universal joint of FIG. 12, taken alont the line 13—13 of FIG. 12.
Figure 12:
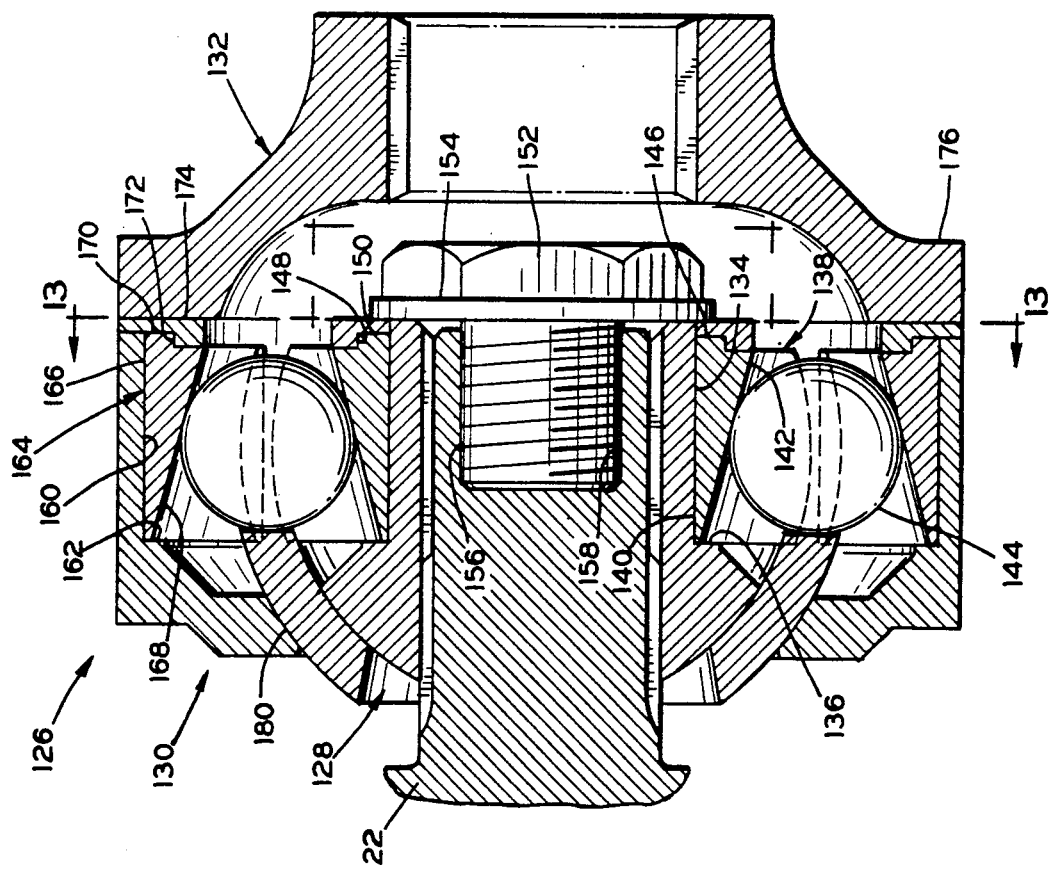
FIG. 12 is a view in vertical cross section of another modified constant velocity universal joint embodying the invention.

Another universal joint embodying the invention is indicated at 126 in FIGS. 12 and 13. This universal joint is a fixed joint whereas the universal joint 20 is of the plunging type, enabling limited axial movement of the shafts which it connects. The joint 126 includes an inner hub member or race 128 which can be integral with the shaft 22 or mounted on the shaft by splines or other suitable means. The joint also includes an outer member or race 130 to which a central hub or annular flange 132 is fastened. The central hub has splines or other suitable means for mounting on another shaft. The inner race 128 has six, in this instance, cavities or recesses 134 uniformly peripherally spaced therearound. The recesses 134 are of substantially semicircular shape in transverse cross section and extend a substantial portion of the length of the inner race. The inner race has a circular flange or shoulder 136 at ends of the recesses.

An insert 138 is located in each of the recesses 134 and has an outer surface 140 of substantially semicircular shape in transverse cross section. The insert 138 has a groove 142 extending throughout its length, which groove is also of substantially semicircular shape in transverse cross section. A rolling element 144, in the form of a ball or roller, is received in each of the grooves 142. The outer end of each of the inserts 138 has axially-extending projections or shoulders 146 which extend beyond the insert ends and engage or cooperate with a peripheral shoulder 148 of a retaining ring 150 to prevent rotation of the insert 138 in the recess 134.

The ring 150 is held in place by suitable fasteners such as a single large hexagonal machine screw 152 which has an outer flange 154 which overlaps the ring 150 to hold it in position. The machine screw 152 has a threaded shank 156 which is received in a central bore 158 of the shaft 22. The machine screw can easily be removed in the field by the use of common tools.

The outer race 130 also has six, in this instance, cavities or recesses 160 which are uniformly peripherally spaced therearound and face inwardly toward the recesses 134, being similar in size and shape. The recesses 160 are of substantially semicircular shape in transverse cross section and extend a substantial portion of the length of the outer race 130, terminating at inner ends 162.

An insert 164 is located in each of the recesses 160 and has an outer surface 166 of substantially semicircular shape in transverse cross section. Each of the inserts 164 also has an inwardly-facing groove 168 to receive one of the rolling elements 144. An end of each of the inserts 164 has axially-extending projections or shoulders 170 which extend beyond the end of the insert and engage or cooperate with a shoulder 172 of a ring 174 to prevent rotation of the insert 164 relative to the recess 160. In this instance, the ring 174 is held in position by an annular flange 176 of the central hub 132 by six suitable fasteners, such as machine screws or bolts 178, which extend through the flange 176 and into the body of the outer race 130. Again, these fasteners 178 can be fastened and removed with common tools.

With the universal joint 126, a half cage 180 abuts the rolling elements 144 and does not extend completely around them as is true of the cage 70. In this instance, the cage 180 is located by partial spherical surfaces on the inner and outer races. This contact also helps retain lubricant around the rolling elements and inserts. The joint 126 can be used in a gear box or the like which contains lubricant, or out in the open using the spherical contacts of seals and/or using with supplementary seals.

Figure 14:
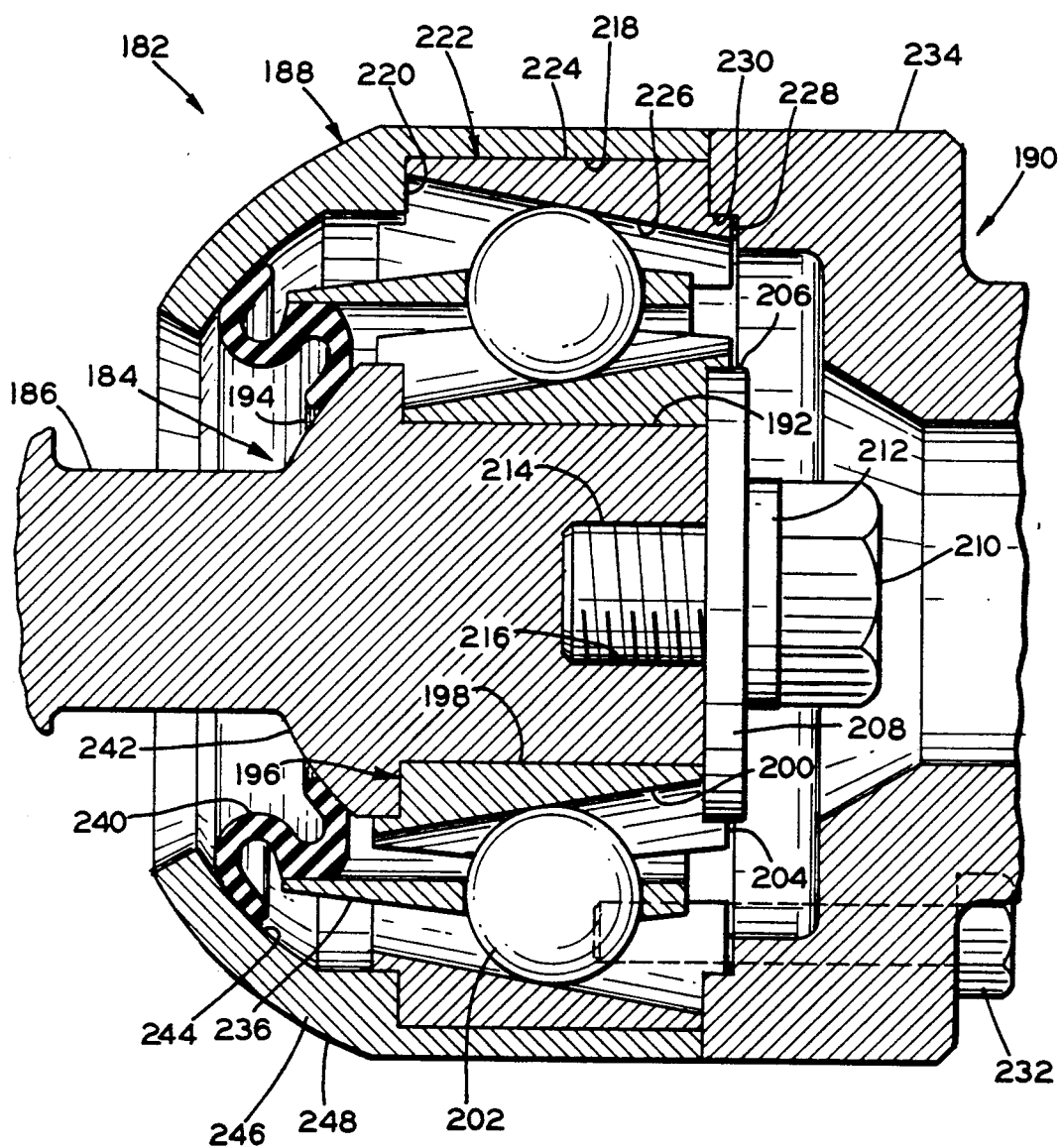
FIG. 14 is a view similar to FIG. 12 of another modified constant velocity universal joint embodying the invention.

Another modified universal joint in accordance with the invention is indicated at 182 in FIG. 14. The joint 182 includes an inner hub member or race 184 which is structurally integral with a shaft 186, since the joint 182 is of a size and configuration that the inner race 184 and the shaft 186 can be assembled with other components as a unit. The joint also includes an outer member or race 188 to which a central hub or annular flange 190 is fastened. The central hub has splines or other suitable means for mounting on another shaft. The inner race 184 again can have six cavities or recesses 192 uniformly peripherally spaced therearound. The recesses 192 are also of substantially semicircular shape in transverse cross section and extend along a substantial portion of the inner race, with the inner race having a thicker flange or shoulder 194 at ends of the recesses. An insert 196 is located in each of the recesses 192 and has an outer surface 198 of substantially semicircular shape in transverse cross section. The insert 196 has a groove 200 extending throughout its length, which groove is also of substantially semicircular shape in transverse cross section. A rolling element 202, in the form of a ball or roller, is received in each of the grooves 200. The outer end of each of the inserts 196 has axially-extending projections or shoulders 204 which extend beyond the ends of the inserts and engage or cooperate with a peripheral shoulder or edge 206 of a retaining ring or washer 208 to prevent rotation of the insert 196 in the recess 192.

The ring 208 is held in place by a large hexagonal machine screw 210 which has a lock washer 212 and overlaps the ring 208. The machine screw 210 has a threaded shank 214 which is received in a central bore 216 of the shaft 186. The machine screw can be easily removed in the field by use of common tools.

The outer race 188 also has six cavities or recesses 218 which are uniformly peripherally spaced therearound and face inwardly toward the recesses 192, being similar in size and shape. The recesses 218 are of substantially semicircular shape in transverse cross section and extend a substantial portion of the length of the outer race 188, terminating at inner ends 220.

An insert 222 is located in each of the recesses 218 and has an outer surface 224 of substantially semicircular shape in transverse cross section. Each of the inserts 222 also has an inwardly-facing groove 226 to receive one of the rolling elements 202. An end of each of the inserts 222 has axially-extending projections or shoulders 228 which extend beyond the end of the insert and engage or cooperate with a shoulder 230 of the hub 190 to prevent rotation of the insert relative to the recess. The hub 190 is affixed to the outer race 188 by six suitable fasteners, such as machine screws or bolts 232, which extend through a thicker flange portion 234 of the hub 190 and into the body of the outer race 188. The fasteners 232 can again be fastened and removed with common tools.

In this instance, the universal joint 182 has a full cage 236 which extends around the rolling elements 202. An S-shaped seal 240 has an intermediate portion engaging the inner surface of the cage 236, has one end portion engaging a partially spherical surface 242 of the inner race 184, and has another end portion engaging an inner, partially spherical surface 244 of an end portion 246 of the outer race 188. An additional, cone-shaped sealing boot can be mounted on the shaft 186 and engage an outer, partially spherical surface 248 of the end portion 246.

Various modifications of the above-described embodiments of the invention will be apparent to those skilled in the art and it is to be understood that such modifications can be made without departing from the scope of the invention, if they are within the spirit and the tenor of the accompanying claims.

I claim:

1. A constant velocity universal joint comprising an inner race having a plurality of uniformly circumferentially-disposed first recesses of substantially semicircular shape in transverse cross section, an outer race having a plurality of second recesses of substantially semicircular shape in transverse cross section and positioned opposite said first recesses, an insert for each of said recesses, said inserts, when worn, being replaceable with new inserts, each of said inserts having a substantially semi-cylindrical outer surface fitting closely with the corresponding recess and a groove of substantially semicircular cross-sectional shape forming an inner surface, roller elements in corresponding grooves of said inserts, means carried by said inner race for retaining the inserts in said first recesses, and means carried by said outer race for retaining the inserts in said second recesses, said inserts having axially-extending projections extending beyond ends thereof and beyond ends of said recesses, said projections cooperating with said retaining means for said first and second recesses to aid in preventing said inserts from rotating in said recesses, and said outer race having additional recesses to receive some of said projections.

2. A constant velocity joint according to claim 1 wherein said means for retaining the inserts in said first recesses comprises a first ring mounted on said inner race at ends of said first recesses.

3. A constant velocity joint according to claim 2 wherein said means for retaining the inserts in said second recesses comprises a second ring mounted on said outer race at ends of said second recesses.

4. A constant velocity joint according to claim 1 wherein said means for retaining the inserts in said second recesses comprises a second ring mounted on said outer race at ends of said second recesses.

5. A constant velocity joint according to claim 6 wherein some of said projections are engaged by an edge of said second ring to aid in preventing said inserts from rotating in said second recesses.

6. A constant velocity joint according to claim 1 wherein said means carried by said outer race comprises a central hub with an annular shoulder cooperating with said projections of some of said inserts.

7. A constant velocity joint according to claim 6 wherein said central hub is connected to said outer race by threaded fasteners.

8. A constant velocity universal joint comprising an inner race having a plurality of uniformly circumferentially-disposed first recesses of substantially semicircular shape in transverse cross section, an outer race having a plurality of second recesses of substantially semicircular shape in transverse cross section and positioned opposite said first recesses, a first insert for each of said first recesses, said inserts, when worn, being replaceable with new inserts, each of said first inserts having a substantially semi-cylindrical outer surface fitting closely with the corresponding first recess and a groove of substantially semicircular cross-sectional shape forming an inner surface, a second insert for each of said second recesses, said second inserts, when worn, being replaceable with new inserts, each of said second inserts having a substantially semi-cylindrical outer surface fitting closely with the corresponding second recess and a groove of substantially semicircular cross-sectional shape forming an inner surface, roller elements in corresponding grooves of said inserts, each of said first inserts having at least one axially-extending projection extending beyond an end thereof and forming a shoulder, each of said second inserts having at least one axially-extending projection extending beyond an end thereof and forming a shoulder, first means carried by said inner race and forming an annular shoulder engagable with the shoulders of the axially-extending projections of said first inserts in said first recesses to prevent rotational movement of said first inserts in said first recesses, second means carried by said outer race and forming a second annular shoulder engagable with the shoulders of the axially-extending projections of said second inserts in said second recesses to prevent rotational movement of said second inserts in said second recesses.

9. A constant velocity universal joint according to claim 8 wherein each of said first inserts has a second axially-extending projection extending beyond the other end thereof and in a direction opposite to the direction of the one projection of said first insert, each of said second inserts has a second axially-extending projection extending beyond the other end thereof in a direction opposite to the direction of the one projection of said second insert, said inner race has an annular shoulder cooperating with the second projections of said first inserts to further aid in preventing rotational movement of said first inserts in said first recesses, and said outer race has an annular shoulder cooperating with the second projections of said second inserts to further aid in preventing rotational movement of said second inserts in said second recesses.

10. A constant velocity universal joint according to claim 8 wherein said first recesses are open at an end of said inner race, the axially-extending projection of each of said first inserts also extends beyond the end of said inner race, said second recesses are open at an end of said outer race, and the axially-extending projection of each of said second inserts extends beyond the end of said outer race.

11. A constant velocity universal joint according to claim 8 wherein said second means comprises a central hub, and fastener means affixes said central hub to said outer race.

12. A constant velocity universal joint according to claim 8 wherein said first means comprises a first ring mounted on said inner race at ends of said first recesses.

13. A constant velocity universal joint according to claim 8 wherein said second means comprises a second ring mounted on said outer race at ends of said second recesses.

14. A constant velocity universal joint comprising an inner race having a plurality of uniformly circumferentially-disposed first recesses of substantially semicircular shape in transverse cross section, an outer race having a plurality of second recesses of substantially semicircular shape in transverse cross section and positioned opposite said first recesses, a first insert for each of said first recesses, said inserts, when worn, being replaceable with new inserts, each of said first inserts having a substantially semi-cylindrical outer surface fitting closely with the corresponding first recess and a groove of substantially semicircular cross-sectional shape forming an inner surface, a second insert for each of said second recesses, said second inserts, when worn, being replaceable with new inserts, each of said second inserts having a substantially semi-cylindrical outer surface fitting closely with the corresponding second recess and a groove of substantially semicircular cross-sectional shape forming an inner surface, roller elements in corresponding grooves of said inserts, each of said first inserts having at least one axially-extending projection extending beyond an end thereof and forming a shoulder, each of said second inserts having at least one axially-extending projection extending beyond an end thereof and forming a shoulder, said inner and outer races having ends facing in a common direction, said first and second recesses having open ends at the ends of the respective inner and outer races, a ring, a threaded fastener affixing said ring centrally to the end of said inner race, said ring having an outer diameter forming an annular shoulder cooperating with the shoulders of said axially-extending projections of said first inserts to prevent rotational movement of said first inserts in said first recesses, a central hub, means affixing said central hub to the end of said outer race, said central hub having an annular shoulder cooperating with the shoulders of said axially-extending projections of said second inserts to prevent rotational movement of said second inserts in said second recesses.

15. A constant velocity universal joint according to claim 14 wherein said projections are at both ends of said inserts and are substantially identical.

16. A constant velocity universal joint comprising an inner race having a plurality of uniformly circumferentially-disposed first recesses of substantially semicircular shape in transverse cross section, an outer race having a plurality of second recesses of substantially semicircular shape in transverse cross section and positioned opposite said first recesses, an insert for each of said recesses, said inserts, when worn, being replaceable with new inserts, each of said inserts having a substantially semi-cylindrical outer surface fitting closely with the corresponding recess and a groove of substantially semicircular cross-sectional shape forming an inner surface, said inserts having axially-extending projections extending beyond ends thereof and beyond ends of said recesses, roller elements in corresponding grooves of said inserts, a first ring mounted on said inner race at ends of said first recesses for retaining the inserts in said first recesses, and a central hub with an annular shoulder cooperating with said projections of said some of said inserts for retaining the inserts in said second recesses, said projections also cooperating with said first ring and said central hub to aid in preventing said inserts from rotating in said recesses, said outer race having additional recesses to receive some of said projections, and threaded fasteners connecting said central hub to said outer race.

17. A constant velocity joint according to claim 16 wherein some of said projections are engaged by an edge of said first ring to aid in preventing said inserts from rotating in said first recesses.

* * * * *

UNITED STATES PATENT AND TRADEMARK OFFICE
CERTIFICATE OF CORRECTION

PATENT NO.  : 5,222,914
DATED       : June 29, 1993
INVENTOR(S) : Philip J. Mazziotti It is certified that error appears in the above-identified patent and that said Letters Patent is hereby corrected as shown below:

Column 2, line 67, change "peropheral" to --peripheral--.

Column 7, line 40, claim 5, line 1, change "6" to --4--.

Signed and Sealed this

First Day of February, 1994

Attest:

BRUCE LEHMAN

*Attesting Officer*   *Commissioner of Patents and Trademarks*